June 17, 1952 A. BRUNNER 2,601,085
SPLIT RETAINING RING ARRANGEMENT FOR PISTON PACKING
Filed Sept. 4, 1948 2 SHEETS—SHEET 1
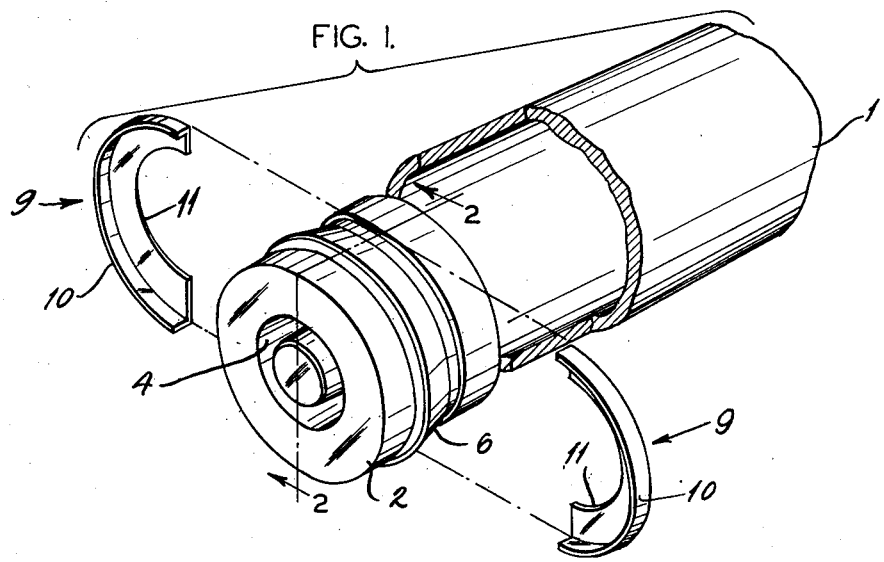
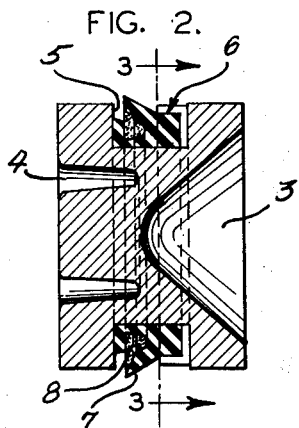
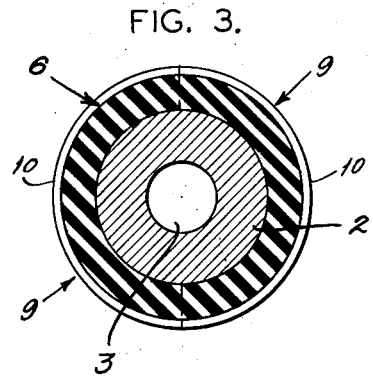
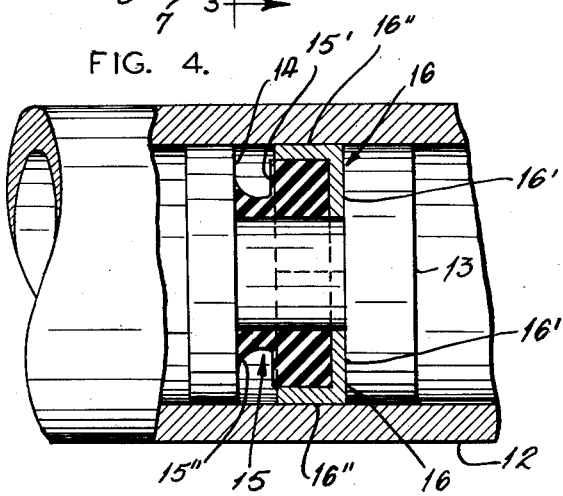
INVENTOR:
Albert Brunner,
by Carr Van P Gravely
HIS ATTORNEYS.

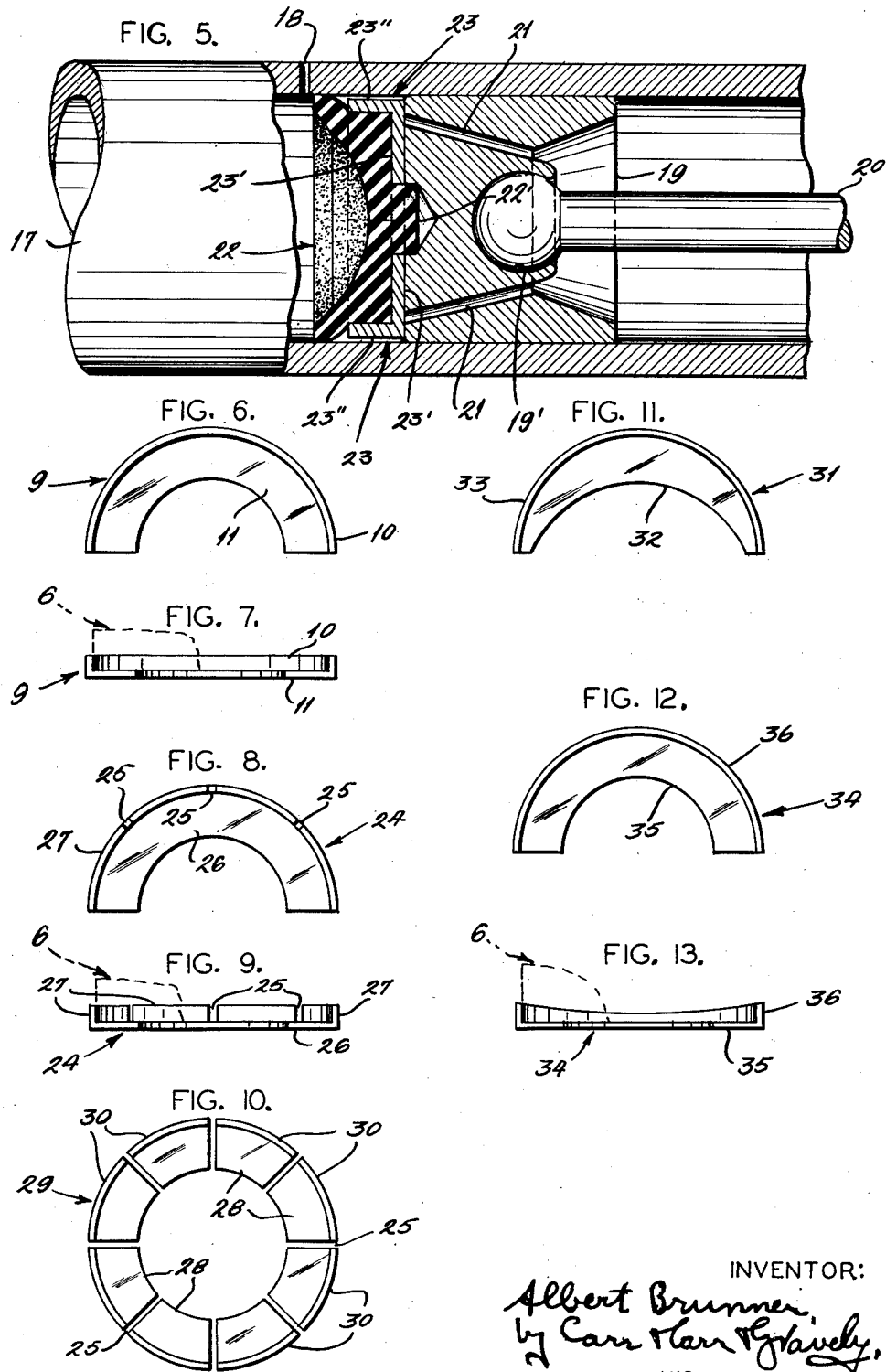

Patented June 17, 1952

2,601,085

UNITED STATES PATENT OFFICE 2,601,085

SPLIT RETAINING RING ARRANGEMENT FOR PISTON PACKING

Albert Brunner, Jennings, Mo., assignor to Wagner Electric Corporation, St. Louis, Mo., a corporation of Delaware Application September 4, 1948, Serial No. 47,863

6 Claims. (Cl. 309—33)

This invention relates to wheel cylinders of hydraulic automobile brakes and is more particularly directed to improved means for providing support for the pressure sealing means carried by or mounted on the piston for such cylinder.

The invention consists of a piston for a cylinder, such as the wheel or master cylinder of a hydraulic brake system, which piston is provided with a packing cup that is supported by a two-part ring whose parts are expandable into contact with the cylinder wall for the purpose of preventing extrusion of the rubber between the piston and cylinder wall, and to prevent cup cutting when the piston is used in a master cylinder, and the object of the invention is to provide an improved piston construction for such cylinders.

In the drawings:

Fig. 1 is a perspective exploded view of a piston and cylinder incorporating the invention, Fig. 2 is a sectional view taken substantially along the line 2—2 of Fig. 1, Fig. 3 is a sectional view taken along the line 3—3 of Fig. 2, Fig. 4 is an elevational view, partly in section, of a modification, Fig. 5 is an elevational sectional view of a further modification as applied to a master cylinder, Figs. 6 and 7 are end and side views, respectively, of one of the reinforcing half rings shown in Fig. 1, Figs. 8 and 9 are end and side views, respectively, of a modified half ring, Fig. 10 is an end view showing a further modification of the ring construction, Fig. 11 is an end view of another modified half ring; and Figs. 12 and 13 are end and side views, respectively, of a still further modified half ring construction.

The preferred embodiment of the invention is disclosed in Figs. 1–3 in which the numeral 1 designates a portion of a wheel cylinder of a hydraulic brake system that slidably receives piston 2. The piston 2 is provided with a suitable socket 3 in which a piston rod (not shown) seats, and its opposite end has an annular groove 4 formed therein which is intended to receive one end of a spring (not shown) as is customary in the automobile hydraulic brake art.

Between the ends of the piston on the periphery thereof an annular groove 5 is cut in which a pressure sealing ring 6 is received. This ring is provided with a lip 7 and a fluid receiving groove 8 so that fluid under pressure therein may expand the lip 7 into engagement with the inner wall of cylinder 1. A support for the rear portion of the seal is provided in the form of two split or half ring sections 9, each having a radial web 11 provided with an axial flange 10 that overlies or embraces the rear portion of the sealing ring 6. The half rings 9 are disposed in the annular groove 5 between the sealing ring 6 and one end of said groove. Under normal expanded condition of the sealing ring 6, the inner surface of web 11 engages the lowermost surface of the annular groove 5 so that the outer surface of the flange 10 will be aligned with the peripheral surface of piston 2. Upon admission of fluid under pressure into groove 8, the rear portion of the sealing ring 6 will also expand and force the flanges 10 of half ring sections 9 against the inner cylinder wall, thereby preventing extrusion of the sealing ring between the piston and the cylinder; and will also prevent tipping of the sealing ring 6 in the annular groove 5. The ring sections 9 and flanges 10 are forced into engagement with the inner wall of cylinder 1 and, in effect, constitute a second seal in addition to their function of preventing the extrusion of the rubber from which sealing ring 6 is usually formed.

Fig. 4 illustrates a modified construction in which a cylinder 12 is provided with a one-piece piston 13 slidably mounted therein. The piston 13 is provided with an annular groove 14 that receives a sealing ring 15. Ring 15 is an annular member whose end 15' is substantially rectangular in shape, and whose other end has a lip 15'' with a groove between the parts for receiving fluid under pressure that acts on lip 15'' and expands end 15'. Ring sections 16, similar to those described above, each provided with a radial web 16' and an axial flange 16'', are assembled into the annular groove so that the web is disposed between sealing ring 15 and one end of the annular groove 14. The flanges of the ring sections overlie or embrace the rear portion of the sealing ring 15. Ring sections 16 are preferably made from a suitable yieldable plastic material and the flanges 16'' thereof are forced into tight contact with the inner wall of the cylinder when pressure is applied to sealing ring 15. The function of ring sections 16 is identical with that of ring sections 9.

A further modification of the structure of Fig. 1 is shown in Fig. 5 wherein the invention is applied to a master cylinder 17 provided with a compensating port 18. A piston 19 is slidably mounted in the cylinder and is moved therein by rod 20 actuated by suitable mechanism (not shown). The piston is provided with suitable passages 21 as is customary in the hydraulic brake art.

A pressure packing or sealing cup 22 is positioned adjacent the forward end of the piston and is held in contact with said piston by the customary piston return spring (not shown) or by means of a cup projection 22' that snugly fits a socket 19' in the cylinder 19. The two ring sections 23 are made from a suitable plastic material constructed with a radial web 23' and an axial flange 23'' assembled between the end of piston 19 and the sealing cup 22. The rear portion of this sealing cup is embraced by the flanges in the same manner as described above, and the radial web engages a portion of the sealing ring by which it is attached to the piston. The function of the ring sections is identical with that described above and, in addition, the flanges of the ring sections prevent cup cutting by the inner edges of the compensating port, the ring flange preventing the extrusion of cup material into the compensating port. The cup is protected at the point where sufficient pressure is built up ahead of the piston so as to cause extrusion into port 18 after the lip of the cup has passed the port.

Figs. 6 and 7 clearly show the construction of the ring portions 9, a section of the sealing ring being shown in dotted lines in Fig. 7.

Figs. 8 and 9 show half ring sections 24 having radial webs 26 and axial flanges 27. The flanges are divided into a plurality of sub-sections by reason of slots 25 being cut therein. These slots 25 facilitate the flexing of flange 27 into engagement with the inner wall of the cooperating cylinder, thereby increasing the effectiveness of the sealing action of the rings. A section of a sealing ring is shown in dotted lines in Fig. 9 to show how the two are assembled.

Fig. 10 shows a reinforcing ring divided into a plurality of parts 29, each part being provided with a radial web 28 and an axial flange 30. This construction is a variation of that shown in Figs. 8 and 9 in that the slots 25 extend through the web portion of the ring.

Fig. 11 shows a ring section 31 having a radial web 32 and an axial flange 33. The web 32 is in the form of a beam of substantially uniform strength. This construction permits more flexing at the ends of the ring section than at the center point, thereby resulting in a more uniform pressure between the flange and the inner cylinder wall, thus achieving a more uniform sealing action about the periphery of the ring section flange.

Figs. 12 and 13 show a ring section 34 provided with a radial web 35 and an axial flange 36. This ring section has a variable length flange and a web having a uniform radial width. The outward movement at the extremities of the ring section is less than at the center point but to secure uniform pressure between the flange and the cylinder wall the flange length is changed so that the lesser outward movement of the ring extremities will produce a uniform sealing action over all portions of the flange. A portion of a sealing ring is shown in dotted lines in Fig. 13 to show how the ring and seal are assembled.

What I claim is:

1. A piston for a cylinder comprising a longitudinally extended cylindrical body, a piston associated with said body, a seal for said piston, and a resilient circumferentially segmented ring, each segment having a radial web and an axial flange associated with said seal so that the web is disposed between the rearward portion of the seal and the piston, the flange embracing the rearward portion of the seal so that when pressure is applied to the seal the segmented web moves rapidly outwardly, the flange being forced into engagement with said cylinder by the radial expansion of the seal.

2. The structure as defined in and by claim 1 wherein the segmented ring comprises two semicircular parts having the radial web and axial flange associated therewith.

3. The structure as defined in and by claim 2 wherein the axial flange has a plurality of slots cut therein to aid in the radial expansion of the flange.

4. The structure as defined in and by claim 1 wherein the ring is composed of a plurality of circumferential segments, with each segment having the radial web and axial flange.

5. The structure as defined in and by claim 1 wherein the segmented ring comprises an axial flange and a radial web of varying depth, the web decreasing in depth from the center of the segment towards each end.

6. The structure as defined in and by claim 1 wherein the segmented ring comprises a radial web of uniform radial width and an axial flange of variable length, the length decreasing from each end of each segment towards the center thereof.

ALBERT BRUNNER.

REFERENCES CITED

The following references are of record in the file of this patent:

UNITED STATES PATENTS

| Number | Name | Date |
|---|---|---|
| 1,612,038 | Miller | Dec. 28, 1926 |
| 2,037,084 | Moore | Apr. 14, 1936 |
| 2,298,584 | Onions | Oct. 13, 1942 |
| 2,315,944 | Dick | Apr. 6, 1943 |